United States Patent
Lidian et al.

(10) Patent No.: US 8,892,105 B2
(45) Date of Patent: Nov. 18, 2014

(54) NETWORK NODE, USER EQUIPMENT AND METHODS THEREIN FOR CONFIGURING CELLS FOR DOWNLINK OPERATIONS

(75) Inventors: Namir Lidian, Solna (SE); Jose Luis Pradas, Jorvas (FI); Stefania Sesia, Roquefort les Pins (FR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 196 days.

(21) Appl. No.: 13/511,550

(22) PCT Filed: Apr. 25, 2012

(86) PCT No.: PCT/SE2012/050435
§ 371 (c)(1),
(2), (4) Date: May 23, 2012

(87) PCT Pub. No.: WO2012/150898
PCT Pub. Date: Nov. 8, 2012

(65) Prior Publication Data
US 2012/0329467 A1 Dec. 27, 2012

Related U.S. Application Data

(60) Provisional application No. 61/481,936, filed on May 3, 2011.

(51) Int. Cl.
*H04W 72/00* (2009.01)
*H04W 4/00* (2009.01)
*H04W 72/04* (2009.01)
*H04W 8/22* (2009.01)

(52) U.S. Cl.
CPC .............. *H04W 72/048* (2013.01); *H04W 8/22* (2013.01); *H04W 72/0453* (2013.01); *H04W 72/0413* (2013.01)
USPC ............................ 455/450; 370/328; 370/329

(58) Field of Classification Search
CPC ............................ H04W 72/04; H04W 72/042
USPC .................................. 455/450; 370/328, 329
See application file for complete search history.

(56) References Cited

FOREIGN PATENT DOCUMENTS

WO WO 2012095699 A1 * 7/2012

OTHER PUBLICATIONS

Telecom Italia, et al., "Support for non-adjacent carriers in 4C-HSDPA", 3GPP TSG-Ran WG2 Meeting #73, Feb. 21-25, 2011, pp. 1-10, Taipei, Taiwan, R2-111368.

(Continued)

*Primary Examiner* — Omoniyi Obayanju
(74) *Attorney, Agent, or Firm* — Coats & Bennett, PLLC

(57) ABSTRACT

A method in a network node (110) for configuring cells for downlink operations in a telecommunications system (100) is provided. The network node (110) is configured to support non-contiguous downlink operations on more than one cell ($f_1, f_2, f_3, f_4$) in at least one frequency band. The network node (110) receives a signal from a user equipment (121) in the telecommunications system (100). The signal comprises information about radio access capability of the user equipment (121). Information about radio access capability of the user equipment (121) comprises a first indication which indicates the maximum number of cells that is supported by the user equipment (121) in the non-contiguous downlink operation. Furthermore, the information about radio access capability of the user equipment (121) comprises a second indication which indicates the maximum gap bandwidth between cells ($f_1, f_2, f_3, f_4$) that is supported by the user equipment (121) in the non-contiguous downlink operation. Then, the network node (110) configures more than one cell ($f_1, f_2, f_3, f_4$) for a non-contiguous downlink operation supported by the user equipment (121) based on the first and second indication in the information about radio access capability of the user equipment (121).
A network node (110), a method in user equipment and a user equipment (121) are also provided.

18 Claims, 6 Drawing Sheets

(56) References Cited

OTHER PUBLICATIONS

Zte, "Consideration on non-adjacent aggregation capability signalling for multi-carriers HSPDA", 3GPP TSG-Ran WG2 meeting #73bis, Apr. 11-15, 2011, pp. 1-3, Shanghai, China, R2-111820.

Renesas Mobile Europe Ltd, "Introduction of non-contiguous 4C-HSDPA capability signalling", 3GPP TSG-RAN WG2 Meeting #74, May 9-13, 2011, pp. 1-13, Barcelona, Spain, R2-3027.

Qualcomm Incorporated, "Support for non-adjacent carrier operation in MC-HSDPA", 3GPP TSG-RAN WG2 #73bis, Apr. 11-15, 2011, pp. 1-4, Shanghai, China, R2-112124.

Qualcomm Incorporated, "Support for non-adjacent carrier operation in MC-HSDPA", 3GPP TSG-RAN2#73-Bis, Apr. 11-15, 2011, pp. 1-11, Shanghai, China, R2-112125.

Renesas Electronics Europe, "Capability signalling proposals for non-contiguous 4C-HSDPA operation", 3GPP TSG-RAN WG2 Meeting #73bis, Apr. 11-15, 2011, pp. 1-4, Shanghai, China, R2-112253.

Huawei, et al., "UE capability report for non-contiguous 4C-HSDPA operation", 3GPP TSG RAN WG2 Meeting #74, May 9-13, 2011, pp. 1-4, Barcelona, Spain, R2-112964.

\* cited by examiner

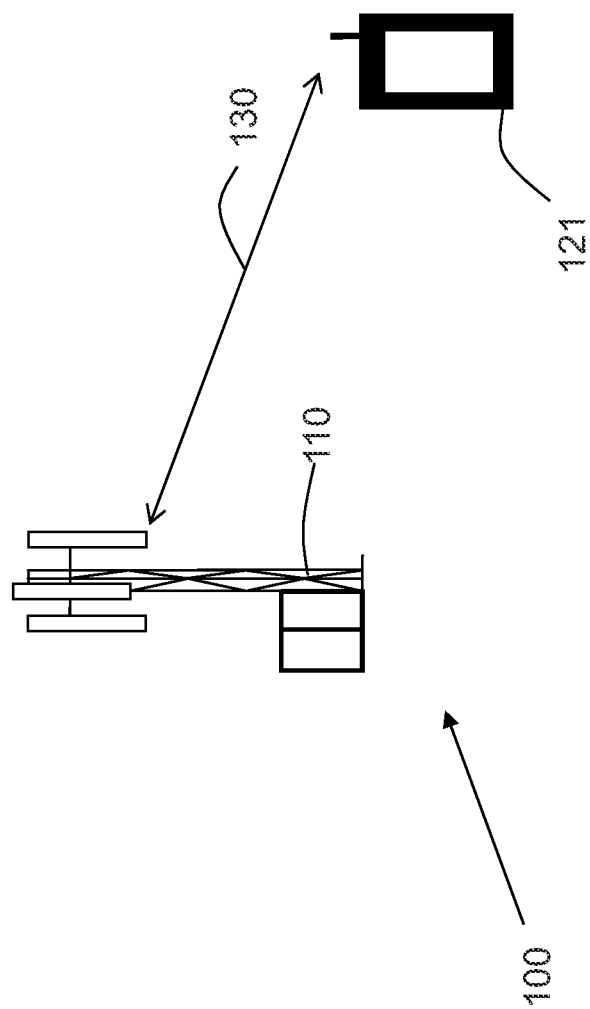

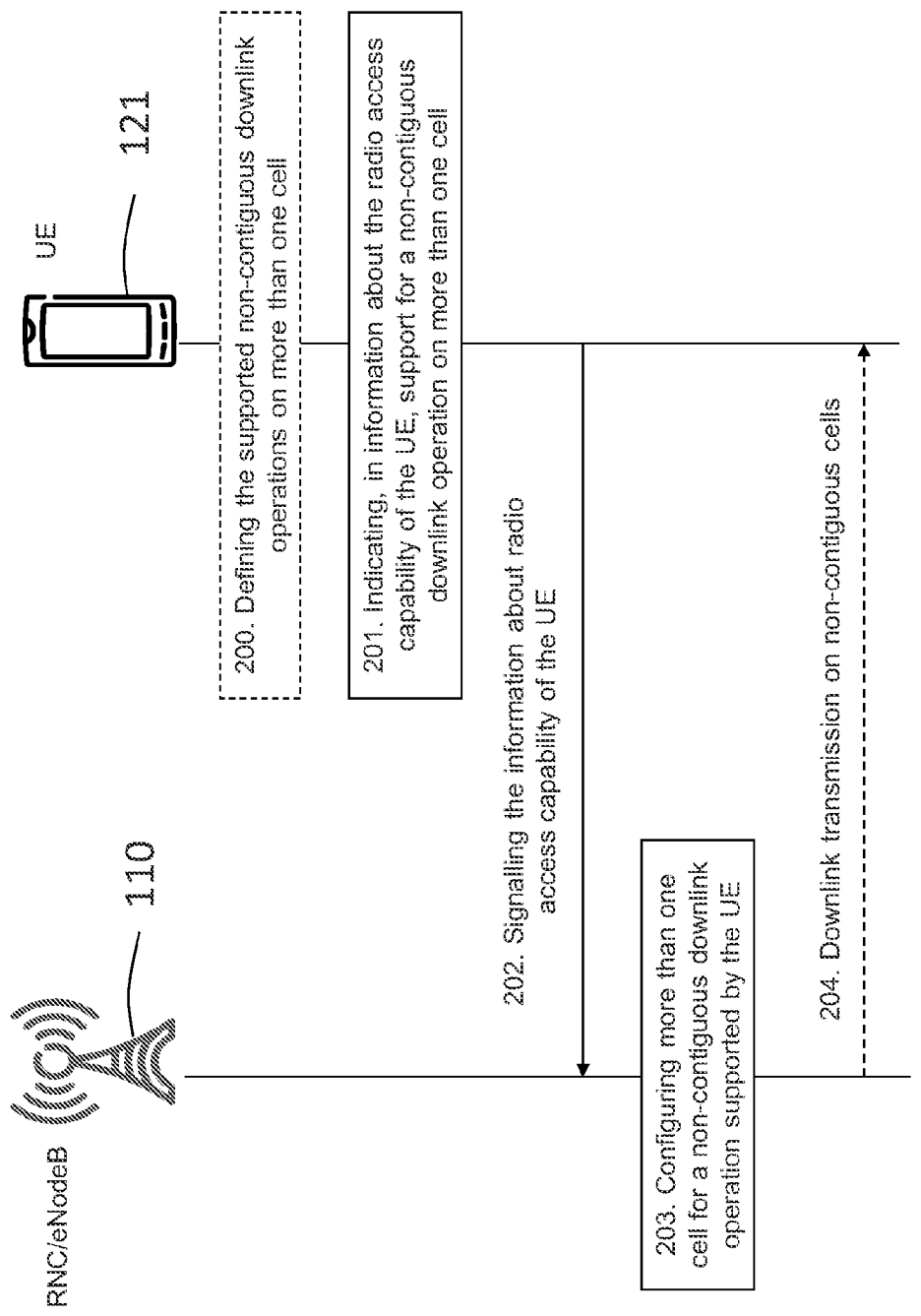

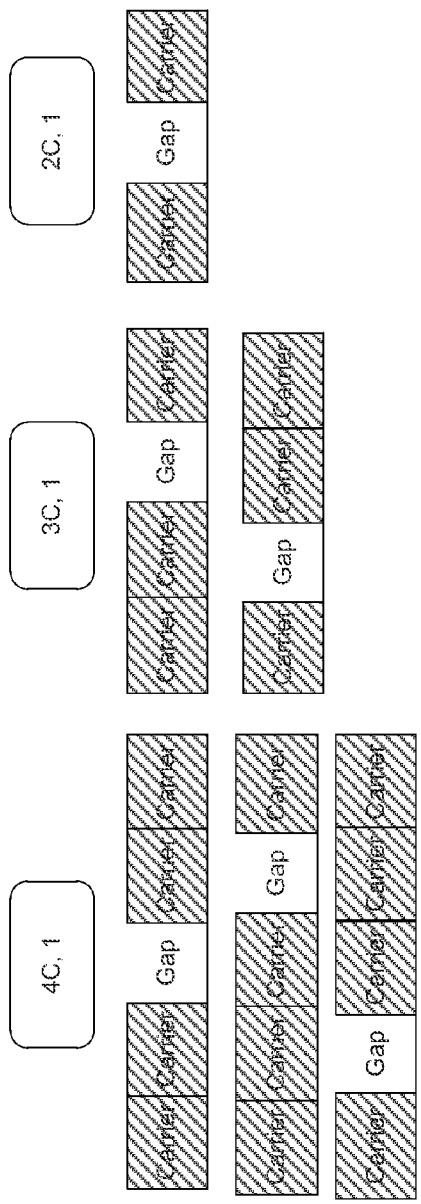
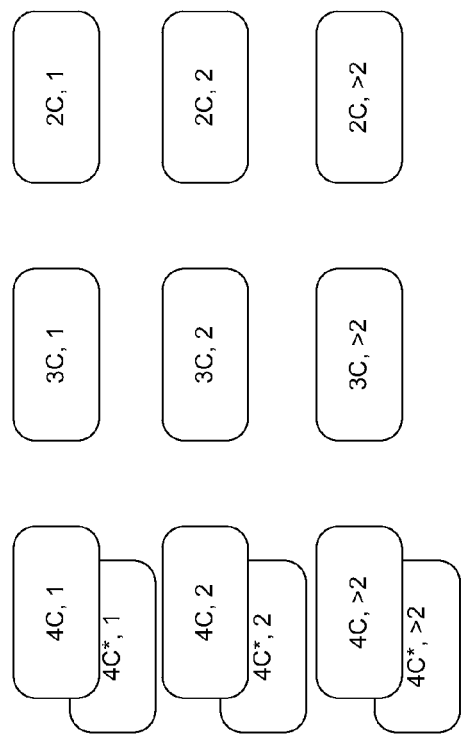
Fig. 5
Fig. 6

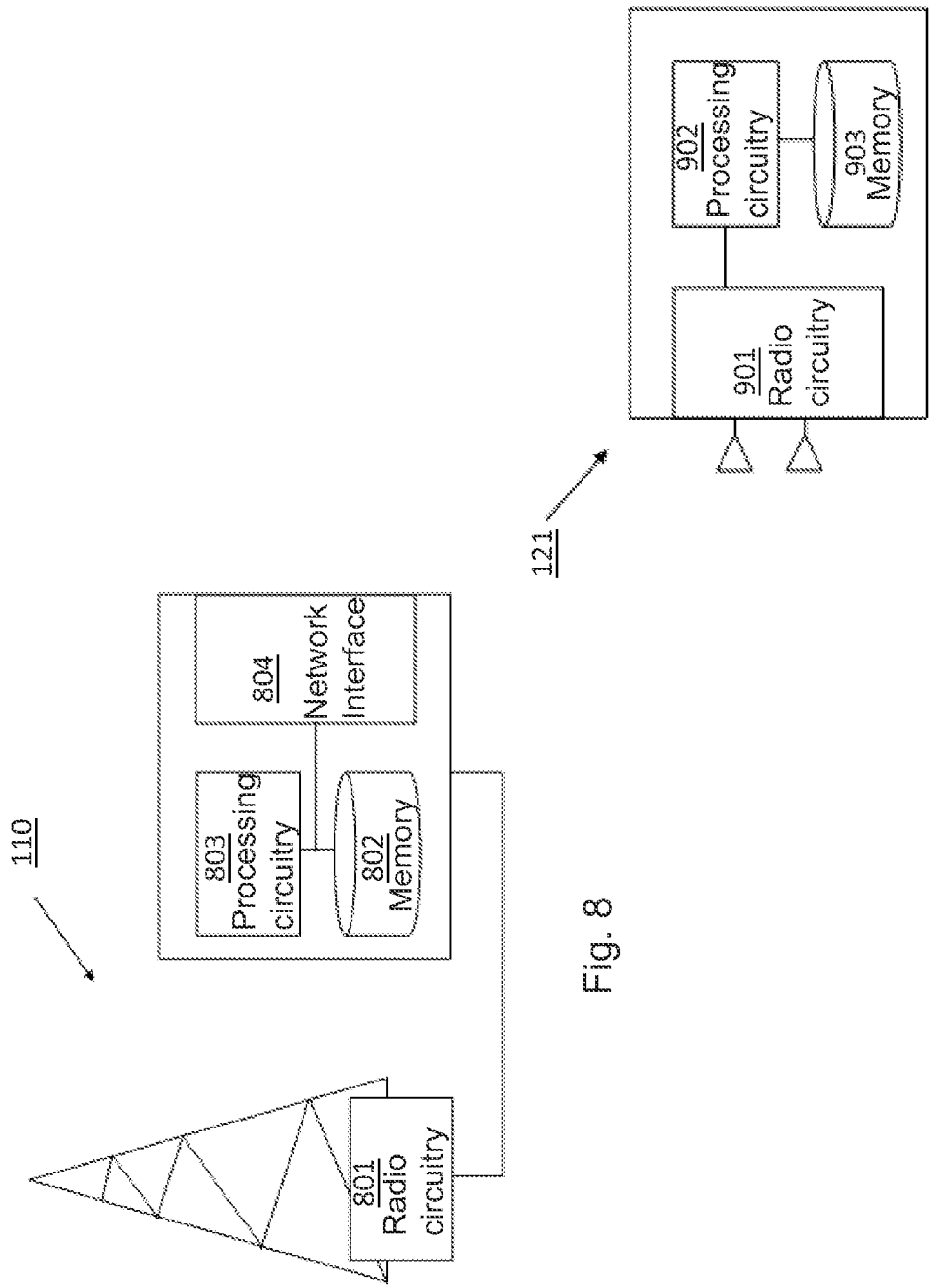

NETWORK NODE, USER EQUIPMENT AND METHODS THEREIN FOR CONFIGURING CELLS FOR DOWNLINK OPERATIONS

TECHNICAL FIELD

Embodiments herein relate to a network node, a user equipment and methods therein. In particular, embodiments herein relate to configuring cells for downlink operations in a telecommunications system.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), out to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions New releases of the specifications for the technologies above are continuously being developed within frameworks, such as, e.g. the $3^{rd}$ Generation Partnership Project (3GPP).

For example, in the period from Release 8 to Release 10 of the 3GPP/WCDMA specification, the support of multi-cell downlink transmissions for High--Speed Downlink Packet Access (HSDPA) where introduced. Further, according to one example, in Release 8 of the 3GPP/WCDMA specification, a Dual-Cell HSDPA (DC-HSDPA) operation was standardized. This allows the radio communications network to schedule simultaneous DL transmissions on two adjacent downlink carriers to a UE simultaneously. An adjacent downlink carrier, frequency or cell may be described as a carrier, frequency or cell whose centre is within 5 MHz of the centre of the currently used frequency and belongs to the same frequency band as that of the currently used frequency. Note that the terms "carrier", "frequency" and "cells" are used interchangeably herein.

According to another example, in Release 9 of the 3GPP/WCDMA specification, support for DC-HSDPA in combination with Multiple Input Multiple Output (MIMO) transmissions was introduced. This provided for peak downlink data rates of up to 84 Mbps. In this release, support for a Dual-Band DC-HSDPA operation was also introduced. This extended the DC-HSDPA operation of Release 8 such that the two configured downlink carriers could be located in different frequency bands.

According to a further example, in Release 10 of the 3GPP/WCDMA specification, a 4 Carrier High-Speed Downlink Packet Access (4C-HSDPA) operation was introduced. This provided for peak downlink data rates of up to 168 Mbps. The four (4) configured downlink carriers may be spread across at most two frequency bands. However, all configured downlink carriers within one and the same frequency band must be adjacent in this 4C-HSDPA operation according to the Release 10 of the 3GPP/WCDMA specification; that is, the configured downlink carriers must be adjacent with in one frequency band or spread across two frequency bands in an adjacent manner.

However, it has been noted that many operators operating within the radio communication network do not have carriers, frequencies or cells allocated contigously in a frequency band, that is, located adjacent to each other. For example, one operator may have two contiguous carriers in one part of the frequency band and two contiguous carriers in another part of the frequency band. In between the two pairs of contiguous carriers in the frequency band, another operator may have and utilize one or more carriers.

This means that operators that do not have strictly contiguous carriers in the frequency band may be prevented from realizing the potential of using, e.g. the 4C-HSDPA operation in Release 10 of the 3GPP/WCDMA specification in the radio communication network.

SUMMARY

It is an object of embodiments herein to provide a more flexible configuration for downlink operations on two or more cells to a user equipment.

According to a first aspect of embodiments herein, the object is achieved by a method in a network node for configuring cells for downlink operations in a telecommunications system. The network node is configured to support non-contiguous downlink operations on more than one cell in at least one frequency band. The network node receives a signal from a user equipment in the telecommunications system. The signal comprises information about radio access capability of the user equipment. The information about radio access capability of the user equipment comprises a first indication which indicates the maximum number of cells that is supported by the user equipment in the non-contiguous downlink operation. Furthermore, the information about radio access capability of the user equipment comprises a second indication which indicates the maximum gap bandwidth between cells that is supported by the user equipment in the non-contiguous downlink operation. Then, the network node configures more than one cell for a non-contiguous downlink operation supported by the user equipment based on the first and second indication in the information about radio access capability of the user equipment.

According to a second aspect of embodiments herein, the object is achieved by a network node for configuring cells for downlink operations in a telecommunications system. The network node is configured to support non-contiguous downlink operations on more than one cell in at least one frequency band. The network node comprises a processing circuitry configured to receive a signal from a user equipment in the telecommunications system. The signal comprises information about radio access capability of the user equipment. The information about radio access capability of the user equipment comprises a first indication which indicates the maximum number of cells that is supported by the user equipment in the non-contiguous downlink operation. Furthermore, the information about radio access capability of the user equipment comprises a second indication which indicates the maximum gap bandwidth between cells that is supported by the user equipment in the non-contiguous downlink operation. Further, the processing circuitry is configured to configure more than one cell for a non-contiguous downlink operation supported by the user equipment based on the first and second indication in the information about radio access capability of the user equipment.

According to a third aspect of embodiments herein, the object is achieved by a method in a user equipment for signalling information about radio access capability of the user equipment to a network node in a telecommunications system. The user equipment is configured to support non-contiguous downlink operations on more than one cell in at least one frequency band. The user equipment indicates in the information about radio access capability of the user equipment, a first indication which indicates the maximum number of cells that is supported by the user equipment in the non-contiguous downlink operation. Furthermore, the user equipment indicates in the information about radio access capability of the user equipment, a second indication which indicates the maximum gap bandwidth between cells that is supported by the user equipment in the non-contiguous downlink operation. Then, the user equipment signals the information about radio access capability of the user equipment comprising the first and second indication to the network node.

According to a fourth aspect of embodiments herein, the object is achieved by a user equipment for signalling information about radio access capability of the user equipment to a network node in a telecommunications system. The user equipment is configured to support non-contiguous downlink operations on more than one cell in at least one frequency band. The user equipment comprises a processing circuitry is configured to indicate, in the information about radio access capability of the user equipment, a first indication which indicates the maximum number of cells that is supported by the user equipment in the non-contiguous downlink operation. Furthermore, the processing circuitry is configured to indicate, in the information about radio access capability of the user equipment, a second indication which indicates the maximum gap bandwidth between cells that is supported by the user equipment in the non-contiguous downlink operation. Further, the processing circuitry is configured to signal the information about radio access capability of the user equipment comprising the first and second indication to the network node.

By signalling the information about radio access capability of the user equipment comprising the first and second indication from the user equipment to the network node as described above, a network node is enabled to determine one or more of any non-contiguous downlink operations that is supported by the user equipment.

It follows that, the network node may configure more than one cell for a downlink operation in a non-contiguous manner, i.e. with a gap between the more than one cells, that the network node has established via the signalling is supported by the user equipment.

This means that operators that do not have cells allocated contigously in a frequency band, i.e. that have more than one cell with a gap in between, now also advantageously may utilize the benefits of using the 4C-HSDPA operation in Release 10 of the 3GPP/WCDMA specification.

Hence, a more flexible configuration for downlink operations on two or more cells to a user equipment is achieved,

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 1 is a schematic block diagram illustrating embodiments in a telecommunications system, FIG. 2 is a signalling scheme depicting embodiments of a method in the telecommunications system, FIG. 5 is a schematic overview further depicting exemplary non-contiguous downlink operation scenarios according to some embodiments of the methods, the network node and user equipment, FIG. 6 is a schematic overview depicting non-contiguous downlink operation scenarios according to some embodiments of the methods, the network node and user equipment, FIG. 8 is a schematic block diagram of embodiments of a network node, FIG. 9 is a schematic block diagram of embodiments of a user equipment.

DETAILED DESCRIPTION

Figure 4:
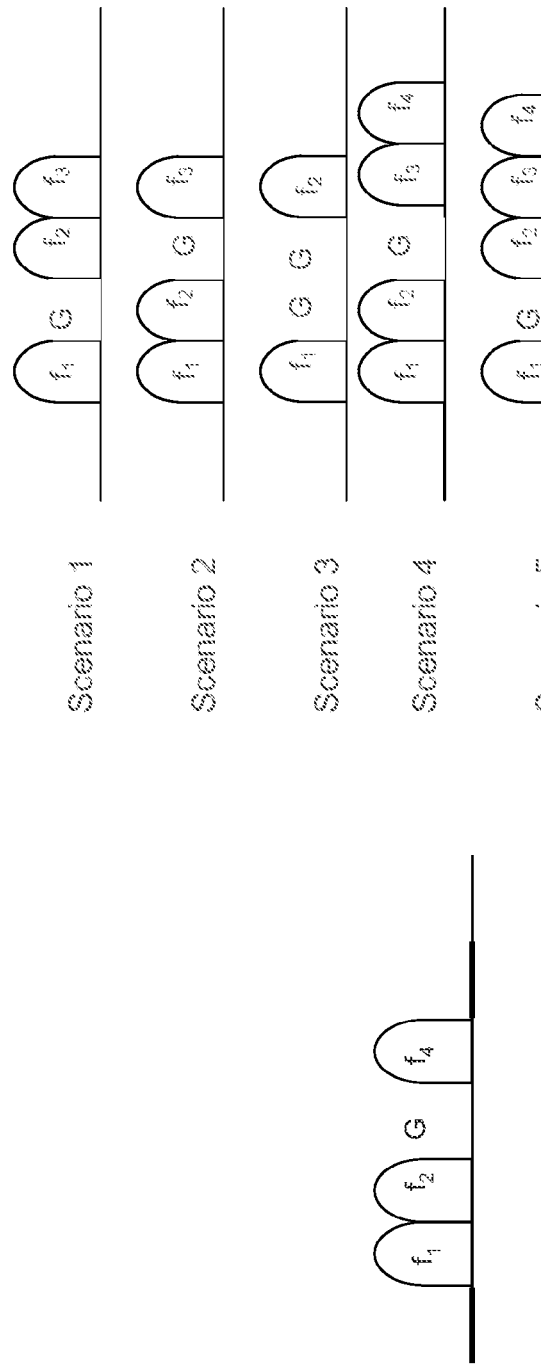
FIG. 4 is a schematic overview depicting exemplary non-contiguous downlink operation scenarios according to some embodiments of the methods, the network node and user equipment.

The figures are schematic and simplified for clarity, and they merely show details which are essential to the understanding of the embodiments, while other details have been left out. Throughout, the same reference numerals are used for identical or corresponding parts or steps.

FIG. 1 depicts a telecommunications system 100 in which embodiments herein may be implemented. The cellular communications system 100 is a wireless communication network such as an LTE, WCDMA, GSM network, any 3GPP cellular network, or any cellular network or system. The telecommunications system 100 may also be referred to as a radio communications network.

The telecommunications system 100 comprises a base station, which is a network node and is therefore referred to herein as the network node 110. The network node 110 may in this example e.g. be an eNB, eNodeB, or a Home Node B, a Home eNode B, femto Base Station (BS), pico BS or any other network unit capable to serve a user equipment or a machine type communication device which are located in an area served by the network node 110 in the telecommunications system 100.

A user equipment 121 is located within the area served by the network node 110. The user equipment 121 is configured to communicate within the telecommunications system 102 via the network node 110 over a radio link 130 when the user equipment 121 is present in the area served by the network node 110. The user equipment 121 may, for example, be a mobile terminal or a wireless terminal, a mobile phone, a computer such as for example a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Embodiments of a method in a telecommunications system 100 will now be described with reference to the signalling scheme between the network node 110 and the user equipment 121 depicted in FIG. 2. The signalling scheme in FIG. 2 may comprise the following actions, and may be implemented for any of the below mentioned embodiments or in any combination with those. Note that an overview of the signalling scheme is illustrated in FIG. 2, and that all the steps performed may not be shown in order to simplify.

Actions 200

If not already defined in the user equipment 121, the user equipment 121 may, in this optional action, define a non-contiguous downlink operation on more than one cell supported by the user equipment 121, i.e. the single-band non-contiguous 4 carrier (SB-NC-4C) capability signaling. This definition may be based on the Radio Frequency (RF) receiver characteristics of the user equipment 121. It may further also be based on a number of assumptions, which are described below with reference to FIGS. 3-4.

Figure 3:
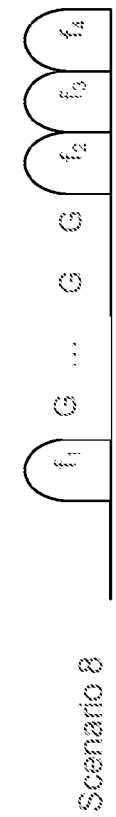
FIG. 3 is a schematic overview depicting an exemplary non-contiguous downlink operation scenario according to an embodiment of the methods, the network node and user equipment.

There could be many different scenarios for the non-contiguous downlink operations on more than one cell supported by the user equipment 121, i.e. the SB-NC-4C capability, as illustrated in FIGS. 3-4. In some embodiments, the user equipment 121 may e.g. support only some of these scenarios depending on the number of receivers, the hardware design of the receiver and other specific implementation characteristic, i.e. the Radio Frequency (RF) receiver characteristics of the user equipment 121.

Alternatively, in some embodiments, the user equipment 121 may support a subset of the non-contiguous downlink operations on more than one cell, i.e. the SB-NC-4C capability. This could potentially give some room for the user equipment 121 to support any number of scenarios or all scenarios of non-contiguous carriers, frequencies or cells. Accordingly, this enables the resulting signalling to be flexible and indicates the maximum number of supported non-contiguous carrier combinations supported by the user equipment 121 scenarios.

This means that the user equipment 121 may define a first, second, and third indication in an information about radio access capability of the user equipment 121 based on the number of receivers in the user equipment 121, on the hardware design of receiver(s), and/or on other characteristics of the radio frequency receiver(s) in the user equipment 121.

Action 201

In this action, the user equipment 121 indicates, in information about the radio access capability of the user equipment 121, support for a non-contiguous downlink operation on more than one cell, i.e. any SB-NC-4C scenario. According to sonic embodiments, to achieve the signaling of any SB-NC-4C scenario the following capabilities are indicated by the user equipment 121 to network node 110.

The user equipment 121 indicates in the information about radio access capability of the user equipment 121, a first indication which indicates the maximum number of cells that is supported by the user equipment 121 in a non-contiguous downlink operation. This may be performed by the user equipment 121 by indicating support of two cells (2C), three cells (3C) and/or four cells (4C), i.e. 2C, 3C, and/or 4C aggregated frequencies. This support is indicated in the information about radio access capability of the user equipment 121. This may be performed, for example, in an "Aggregated Carriers" IE in a "UE radio access capability extension" information element (IE). One example of a UE radio access capability extension" information element (IE) is shown in Table 1 below.

In some embodiments, this may further be performed by renaming the current "Additional Secondary Cells" information element (IE) to "Aggregated Carriers" IE in the "UE radio access capability extension" IE. In some embodiments, the current signaling and naming conventions for the "Additional Secondary Cells" information element (IE) may be reused. That is, where an a1 reference may mean the user equipment 121 is a non-dual band UE and supports three aggregated frequencies in one band. Also, an a2 reference may mean that the user equipment 121 is a non-dual band UE and supports four aggregated frequencies in one band.

Thus, in some embodiments, if the user equipment 121 supports non-contiguous multi-cell operation on four cells in the same band, the user equipment 121 may include the IE "Aggregated cells" in the IE "UE radio access capability extension" and set it to 'a2' for the supported bands. Also, if the user equipment 121 supports non-contiguous multi-cell operation on three cells in the same band, the user equipment 121 may include the IE "Aggregated cells" in the IE "UE radio access capability extension" and set it to 'a1' for the supported bands.

Furthermore, the user equipment 121 indicates in the information about radio access capability of the user equipment, a second indication which indicates the maximum gap bandwidth between cells that is supported by the user equipment 121 in a non-contiguous downlink operation. This may be performed by the user equipment 121 by indicating the number of gaps, i.e. the gap bandwidth, between two blocks of cells. A block of cells is an aggregation of adjacent carriers/frequencies/cells within one band. When carriers/frequencies/cells within the blocks of cells are contiguous and there is always at least one gap between any two blocks of cells, the blocks of cells are non-contiguous.

In some embodiments, the possible number of gaps, i.e. the gap bandwidth, to be signaled by the user equipment 121 may be, e.g. 1, 2, or >2. This may be achieved by the user equipment 121 adding the UE Information element "Number of gaps" IE in "UE radio access capability extension" IE as described e.g. in Table 1 below. That is, the "Number of gaps" IE may be set to the corresponding gap bandwidth.

Thus, in some embodiments, the user equipment 121 may include the IE "Number of gaps" in the IE "UE radio access capability extension" for the supported bands.

In some embodiments, if the user equipment 121 supports non-contiguous multi-cell operation on two, three or four cells in the same band, the user equipment 121 may include the IE "Number of gaps" in the IE "UE radio access capability extension" for the supported bands.

In some embodiments, wherein the user equipment 121 supports a maximum of four cells, e.g. $f_1$, $f_2$, $f_3$, $f_4$, in FIGS. 3-4, the user equipment 121 may indicate a third indication in the information about radio access capability of the user equipment 121. This third indication may indicate whether the user equipment 121 supports an equal number of cells on each side of a gap between the four cells, or a different number of cells on each side of a gap between the four cells.

This may be performed by the user equipment 121 by, for 4C aggregated carriers (i.e. supporting a maximum of four cells) indicating in the signalling that the user equipment 121 is a non-dual band UE and supports 4 aggregated frequencies in one band and the number of contiguous cells on each side of the gap is equal or that the number of contiguous cells on each side of the gap is different. This enables the user equipment 121 to, for example, distinguish and separately signal the scenarios 4 and 5 in FIG. 4, or distinguish and separately signal the scenarios 6 and 7 in FIG. 4.

In some embodiments, the a2 reference may be redefined to mean that the user equipment 121 is a non-dual band UE and supports four aggregated frequencies in one band, as described above, and that the maximum number of aggregated cells in one block is 2.

In some embodiments, the user equipment 121 may add a reference a2b in to the "Aggregated Carriers" IE in "UE radio access capability extension" IE. The reference a2b may means that the user equipment 121 is a non-dual band UE and supports four aggregated frequencies in one band and that the number of contiguous cells on each side of the gap are equal. Then, in some embodiments, if the reference a2b is absent, this may mean that the user equipment 121 is a non-dual band UE and supports four aggregated frequencies in one band and that the number of contiguous cells on each side of the gap is different. Thus, the reference a2b is a further example which gives the user equipment 121 the possibility to distinguish and separately signal the scenarios 4 and 5 in FIG. 4, or to distinguish and separately signal the scenarios 6 and 7 in FIG. 4.

In some embodiments, the above may be performed by the user equipment 121 by, for 4C aggregated carriers (i.e. supporting a maximum of four cells), indicating a "Symmetric blocks" IE in the "UE radio access capability extension" IE in the signalling.

In some embodiments, if the "Symmetric blocks" IE is absent, this may mean that the number of contiguous cells on each side of the gap is different for the case of four carriers. Thus, if the user equipment 121 supports non-contiguous multi-cell operation on four cells in the same band, and if the number of contiguous cell on each side of the gap is equal, the user equipment 121 may perform signaling comprising the IE "Symmetric blocks" in the "UE radio access capability extension" IE for the supported bands.

In some embodiments, the two spare references, e.g. spare1 and spare2 indicated in Table 1, may e.g. be added by the user equipment 121 to the "Aggregated Carriers" IE in the "UE radio access capability extension" IE. This may be performed in order to extend the number of carriers/frequencies/cells to six carriers and/or eight carriers.

In some embodiments, the "UE radio access capability extension" IE may comprise the following information elements, shown in Table 1:

TABLE 1

| Information Element/Group name | Need | Multi | Type and reference | Semantics description | Version |
|---|---|---|---|---|---|
| >>Aggregated cells | OP | | Enumerated(a1, a2, spare1, spare2) | The absence of the IE and absence of the IE "Number of gaps" means that the UE does not support multi-cell operation on three and four cells, and non-contiguous multi-cell HSDPA operation. If this IE is present and the IE "Number of gaps" is absent indicates support of multi-cell HSDPA operation on three cells or multi-cell HSDPA operation on four cells. | REL-10 |
| >>Number of gaps | OP | | Enumerated(1, 2, >2) | This IE indicates the number of 5 MHz gaps. If absent, it indicates no support for non-contiguous muti-cell HSDPA operation on three cells or four cells. If the IE "Number of gaps" is absent but this IE is present then non-contiguous multi-cell HSDPA operation operation is supported on two cells only. | REL-10 |
| >>Symmetric blocks | OP | | Enumerated(TRUE) | Indicates that both blocks contain the same number of contiguous cells. See Note 1 | REL-10 |

(End of Table 1)

It should be noted that the signalling described above does not affect the legacy signalling for a dual cell dual band UE.

In some embodiments, if a user equipment 121, for example, supports only contiguous multi-cell HSDPA on two cells only in a single band, then the status of "Aggregated Carriers", "Number of gaps" and "Symmetric blocks" IEs in the information about radio access capability of the user equipment 121 is set to "Absent" by the user equipment 121.

Also, in some embodiments, if a user equipment 121, for example, supports non-contiguous multi-cell HSDPA on two cells only in a single band, then the status of "Aggregated Carriers" IE and the "Number of gaps" IE is set by the user equipment 121 to "Present". In some embodiments, the "Number of gaps" IE may be present and net by the user equipment 121 to the corresponding gap bandwidth.

In some embodiments, the resulting signaling to be performed by the user equipment 121 may be summarized as:

For 1 to (maximum number of combinations), (a) aggregated carriers/frequencies/cells—Optional, Enumerated: a1, a2, (b) number of gaps—Optional, Enumerated: one gap, two gaps, or more than two gaps.

In some embodiments, the following rules in Table 2 may apply:

TABLE 2

| | | Aggregated cells/carriers/frequencies | | | |
|---|---|---|---|---|---|
| | | Absent | Present | | |
| | | | a1 | a2 | Symmetric blocks |
| Number of gaps | Absent | No support of multi-cell HSDPA on | Support of multi-cell HSDPA | Support of multi-cell HSDPA | invalid |

TABLE 2-continued

| | Aggregated cells/carriers/frequencies | | | | |
|---|---|---|---|---|---|
| | Absent | Present | | | |
| | | a1 | a2 | Symmetric blocks | |
| | three cells or four cells and non-contiguous multi-cell HSDPA | operation on three cells | operation on four cells | | |
| Present | Support of non-contiguous multi-cell HSDPA on two cells only | Support of non-contiguous multi-cell HSDPA on three cells | Support of non-contiguous multi-cell HSDPA on four cells. 3 aggregated cells in a block | Present The numbers of contiguous cells on each side of the gap are equal | Absent The number of contiguous cells on each side of the gap are different |

(End of Table 2)

In other words, according to some embodiments, the user equipment 121 may perform signalling which comprises the renamed "Aggregated Carriers" IE (e.g. previously named as "Additional Secondary Cells" IE) in "UE radio access capability extension" IE, the "Number of gaps" IE in "UE radio access capability extension" IE, and the "Symmetric blocks" IE in "UE radio access capability extension" IE. This means that a first, second, and third indication may be comprised in a respective information element in the information about radio access capability of the user equipment 121.

Alternatively, in some embodiments, an additional indication which indicates that the user equipment 121 supports a non-contiguous downlink operation on the more than one cell, e.g. $f_1$, $f_2$, $f_3$, $f_4$, may also be comprised in the "UE radio access capability extension" IE.

Action 202

In this action, the user equipment 121 signals the information about the radio access capability of the user equipment 121 to the network node 110. The signaling may preferably be as minimal as possible. According to some embodiments, signalling is provided to signal the SB-NC-4C operation capability, e.g. in the information about the radio access capability of the user equipment 121 as described above in Action 201, from the user equipment 121 to the network node 110. This means that the user equipment 121 may signal the information about radio access capability of the user equipment 121 comprising the first and second indications to the network node 110.

In this action, the network node 110 receives the signals from the user equipment 121 specifying the possible contiguous or non-contiguous configuration of the downlink carrier(s). This means that the network node 110 receives a signal from the user equipment 121 in the telecommunications system 100. The signal comprises information about radio access capability of the user equipment 121. The information about radio access capability of the user equipment 121 comprises a first indication which indicates the maximum number of cells that is supported by the user equipment 121 in the non-contiguous downlink operation. Furthermore, the information about radio access capability of the user equipment 121 comprises a second indication which indicates the maximum gap bandwidth between cells that is supported by the user equipment 121 in the non-contiguous downlink operation.

Action 203

In this action, the network node 110 configures the downlink carriers supported by the user equipment 121. In other words, the network node 110 configures more than one cell for a non-contiguous downlink operation supported by the user equipment 121. This means that the network node 110 configures more than one cell, e.g. $f_1$, $f_2$, $f_3$, $f_4$, for a non-contiguous downlink operation supported by the user equipment 121 based on the first and second indication in the information about radio access capability of the user equipment 121. It also means that the network node 110 may configure more than one cell, e.g. $f_1$, $f_2$, $f_3$, $f_4$, for a non-contiguous downlink operation supported by the user equipment 121 based on a third indication in the information about radio access capability of the user equipment 121. This may be the case where the information about radio access capability of the user equipment 121 further comprises a third indication. This third indication may indicates to the network node 110 that the user equipment 121 supports a maximum of four cells and whether the user equipment 121 supports an equal number of cells on each side of a gap between the four cells or a different number of cells on each side of a gap between the four cells.

Action 205

According to some embodiments, the user equipment 121 may perform signalling according to the configuring in Action 203 to the user equipment 121, i.e. downlink transmissions on non-contiguous cells.

In regards to FIGS. 3-4, in order to define the SB-NC-4C capability signalling, i.e. the signaling of the non-contiguous downlink operations on more than one cell supported by the user equipment 121, and based on the Radio Frequency (RF) receiver characteristics of the user equipments 121, the following assumptions may be made in the user equipment 121 and in the network node 110:

all non-contiguous carriers are within a single band;
one span of a block of cells may be 5 MHz, 10 MHz or 5 Hz;
one gap, i.e. gap span, G is 5 MHz;
if the user equipment 121 supports more than two gaps (i.e. more than 10 MHz in total gap span), then the user equipment 121 can support any gap size. Gap size may also be referred to as number of gaps, gap bandwidth or total gap span;
if the user equipments 121 indicates support of four carriers and a n×gap (i.e. number of gaps) that implies that the user equipments 121 supports three carriers and n×gap also the support of two carriers and n×gap, where n could be 1, 2 or more than 2.

This means that the maximum gap bandwidth between cells, e.g. $f_1$, $f_2$, $f_3$, $f_4$, may be one gap G with a bandwidth of 5 MHz, or two gaps G with a total gap bandwidth of 10 MHz, or more than two gaps G with the total gap bandwidth of more than 10 MHz.

FIG. 3 is a schematic overview depicting an exemplary non-contiguous downlink operation scenario according to some embodiments of the methods, the network node 110 and user equipment 121.

In FIG. 3, a scenario is depicted for a user equipment 121 which supports two non-contiguous carrier blocks of cells configured within a single band. A block of cells is an aggregation of adjacent carriers/frequencies/cells within one band. However, it should also be noted that a block of cells may also comprise only one carrier/frequencie/cell. When carriers/frequencies/cells within the blocks of cells are contiguous and there is always at least one gap between any two blocks of cells, the blocks of cells are non-contiguous. In FIG. 3, the cells $f_1$, $f_2$ are contiguous and forms a first block of cells, and the cell $f_4$ forms a second block of cells. In between the first and second blocks of cells there is a gap G, thus the first and second blocks of cells are non-contiguous.

FIG. 4 is a schematic overview depicting exemplary non-contiguous downlink operation scenarios according to some further embodiments of the methods, the network node 110 and user equipment 121. In FIG. 4, scenarios are depicted for a user equipment 121 which supports two non-contiguous carrier blocks of cells configured within a single band.

In a first scenario, the cell forms a first block of cells. The cells $f_2$, $f_3$ are adjacent and forms a second block of cells. In between the first and second blocks of cells there is a gap G, thus the first and second blocks of cells are non-contiguous with a total gap size of 5 MHz.

In a second scenario, the cells $f_1$, $f_2$ are adjacent and forms a first block of cells. The cell $f_3$ forms a second block of cells. In between the first and second blocks of cells there is a gap G, thus the first and second blocks of cells are non-contiguous with a total gap size of 5 MHz.

In a third scenario, the cell $f_1$ forms a first block of cells. The cell $f_2$ forms a second block of cells. In between the first and second blocks of cells there are two gaps, i.e. 2×gap G, thus the first and second blocks of cells are non-contiguous with a total gap size of 10 MHz.

In a fourth scenario, the cells $f_1$, $f_2$ are adjacent and forms a first block of cells. The cells $f_3$, $f_4$ are adjacent and forms a second block of cells. In between the first and second blocks of cells there is a gap G, thus the first and second blocks of cells are non-contiguous with a total gap size of 5 MHz.

In a fifth scenario, the cell $f_1$ forms a first block of cells. The cells $f_2$, $f_3$, $f_4$ are adjacent and forms a second block of cells. In between the first and second blocks of cells there is a gap G, thus the first and second blocks of cells are non-contiguous with a total gap size of 5 MHz.

In a sixth scenario, the cells $f_1$, $f_2$ are adjacent and forms a first block of cells. The cells $f_3$, $f_4$ are adjacent and forms a second block of cells. In between the first and second blocks of cells there are two gaps, i.e. 2×gap G, thus the first and second blocks of cells are non-contiguous with a total gap size of 10 MHz.

In a seventh scenario, the cell $f_1$ forms a first block of cells. The cells $f_2$, $f_3$, $f_4$ are adjacent and forms a second block of cells. In between the first and second blocks of cells there are two gaps, i.e. 2×gap G, thus the first and second blocks of cells are non-contiguous with a total gap size of 10 MHz.

In an eight scenario, the cell $f_1$ forms a first block of cells. The cells $f_2$, $f_3$, $f_4$ are adjacent and forms a second block of cells. In between the first and second blocks of cells there are more than two gaps, i.e. >2×gap G, thus the first and second blocks of cells are non-contiguous with a total gap size that is larger than 10 MHz.

The scenarios depicted in FIGS. 3-4 may also be described with reference to FIGS. 5-8 as in the following.

FIG. 5 is a schematic overview of a gap position with two, three or four non-contiguous carriers further depicting exemplary non-contiguous downlink operation scenarios according to some embodiments of the methods, the network node 110 and user equipment 121. FIG. 5 gives a few examples of what the user equipment 121 may support considering the different signaling.

From the network node 110 and the telecommunications system 100 point of view, the design of the signaling between the user equipment 121 and the network node 110 is performed such that the signaling does not indicate the hardware design or other specific characteristic of the particular implementation in the user equipment 121. This is because signaling based on hardware design in the user equipment 121 or particular implementation in the user equipment 121 will not be forward compatible. This is due to the fact that the hardware design in the user equipment 121 or the particular implementation in the user equipment 121 evolves all the time. For example, it is a very likely scenario in the future that UEs, such as, the user equipment 121 will share the same hardware platform for both LTE and WCDMA, and that LTE will drive considerable hardware changes in the near future.

It should be noted that, for example, indicating to the network node 110 from the user equipment 121 whether the user equipment 121 implements one or two receivers does not provide meaningful information to the network node 110 and the telecommunications system 100. This is because different receivers may have very diverse characteristics, such as, for example, the bandwidth of the filter, or number and quality of the filters. For example, an 8C HSDPA operation capability of the user equipment 121 will requires that the user equipment 121 has a considerably increased bandwidth of the receivers and/or number of receivers.

It should also be noted that, for example, for the network node 110 and the telecommunications system 100, whether the user equipment 121 implements a large bandwidth receiver or the user equipment 121 has several receivers, it is transparent. The only thing of interest to the network node 110 and the telecommunications system 100 is whether the user equipment 121 supports the capability or the user equipment 121 does not support the capability, Thus, it may be said that forward compatible signaling for the network node 110 and the telecommunications system 100 may be reduced to the indication of the support, or no support, of non-contiguous 4C. This may imply the support of any possible combination.

In some embodiments, the user equipment 121 may consider supporting a subset of features which could potentially give some room to support a limited number of scenarios of non-contiguous frequencies.

Furthermore, in some embodiments and based on the discussion above, the following three capabilities indicated in the information about radio access capability may be sufficient to indicate different scenarios as depicted in FIGS. 3-7.

First, support of 2C, 3C and/or 4C aggregated frequencies. In some embodiments, the current signaling and naming conventions may be reused, e.g. a1 may mean that the user equipment 121 is a non-dual band UE and supports 3 aggregated frequencies in one band, and a2 may mean that the user equipment 121 is a non-dual band UE and supports 4 aggregated frequencies in one band.

Secondly, the number of gaps, i.e. gap size or gap span bandwidth, between blocks of cells. In some embodiments, the gap span bandwidth is 5 MHz wide. The block of cells may, for example, be a set of contiguous frequencies. The maximum number of contiguous frequencies may, for example, be 3. The possible number of gaps to be signaled may, for example, be: 1, 2, >2.

Thirdly, support for the symmetric or asymmetric blocks of cells. Symmetric blocks of cells are two blocks of cells comprising the same number of contiguous cells, for example, scenario 3, 4 and 6 in FIG. 4. Asymmetric blocks of cells are two blocks of cells comprising different numbers of contiguous cells, for example, scenario 5, 7 and 8 in FIG. 4.

In some embodiments, the signaling may alternatively comprise an additional bit to indicate whether the two blocks share the same bandwidth span or not. In other words, the bit may indicate whether the number of frequencies in a block of cells is even or odd. This may, for example, be useful for 4 carriers when there may be two blocks of cells of 10 MHz, or one block of cells of 5 MHz and another block cells of 15 MHz.

FIG. 6 is a schematic overview depicting non-contiguous downlink operation scenarios with two, three or four non-contiguous carriers with one, two or more than two gaps according to some embodiments of the methods, the network node and user equipment. FIG. 6 depicts possible scenarios which the signaling allows. It may be noted that the symbol '*' separates the symmetric and asymmetric scenarios.

According to some embodiments, this type of signaling may aim to group different scenarios which may have similar requirements or may be equally challenging for the user equipment 121. This signaling of supported scenarios may provide sufficient flexibility to allow different UE implementations.

In some embodiments, the user equipment 121 may support different scenarios at a time. Thus, the signaling cannot pre-empt the user equipment 121 to indicate the support of more than one scenario. Otherwise, a user equipment 121 supporting a specific scenario will only use its capability in the specific area or areas in which the operator own a set of frequencies configured such that the user equipment 121 can make use of its capabilities.

In some embodiments, the user equipment 121 which has been designed to support more demanding requirement, will also support configurations which are less demanding. For example, a user equipment 121 which supports (4C, 2) will also support the configurations (4C, 1), and consequently (3C, 1), and (2C, 1) as well.

This assumption may also provide flexibility for the network node 110 and the telecommunications system 10, as well as, for operators, to manage their frequencies in different ways. For example, an operator which owns 3 frequencies where two of them are contiguous and there are two gaps in between the blocks of cells, i.e. the capability of scenario (3C, 2) is supported, may decide to configure only (2C, 2) for load balancing purposes. According to another example, an operator may own a set of frequencies such as (4C, 2) in one area, i.e. the capability of scenario (4C, 2), but only (2C, 2) in another area, i.e. the capability of scenario (2C, 2). In some embodiments, the user equipment 121 may, if the user equipment 121 support the former configuration, e.g. (4C, 2), inherently support the later configuration, e.g. (2C, 2).

Figure 7:
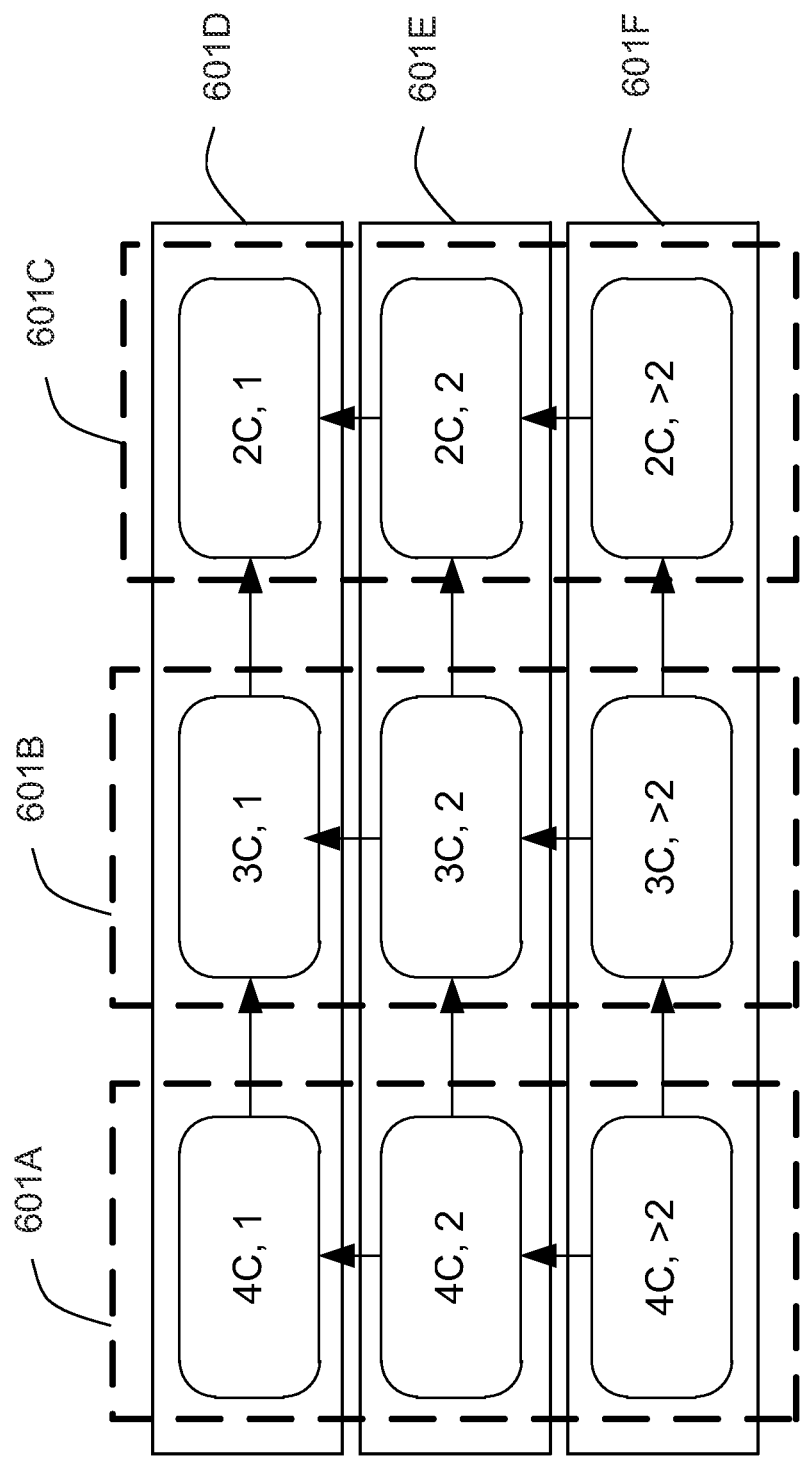
FIG. 7 is a schematic overview depicting non-contiguous downlink operation scenarios according to some embodiments of the methods, the network node and user equipment, ordered into groups.

FIG. 7 is a schematic overview depicting non-contiguous downlink operation scenarios and scenario dependencies with two, three or four non-contiguous carriers with one, two or more than two gaps according to some embodiments of the methods, the network node and user equipment, ordered into groups 601.

In some embodiments, the user equipment 121 may signal only one of the scenarios and, implicitly, the user equipment 121 will indicate the support of the subset of scenarios which belong to the same group 601, as shown in FIG. 7. At most, the user equipment 121 may signal 3 different scenarios.

In some embodiments, the signaling may, for example, be:

For 1 to (maximum number of combinations), a) Aggregated carriers/frequencies/cells—Optional, Enumerated: a1, a2, spare1, spare2 b) Number of gaps—Optional, Enumerated: 1, 2, >2 c) Symmetric blocks—Optional, Enumerated: TRUE

In some embodiments, the references spare1 and spare2 may be used to extend this feature to 6C and 8C in future releases.

In some embodiments, the following rules in Table 3 may apply:

TABLE 3

|  |  | Aggregated cells/carriers/frequencies | | |
| --- | --- | --- | --- | --- |
|  |  |  | Present | |
|  |  | Absent | a1 | a2 |
| Number of gaps | Absent | No support of multi-cell HSDPA on three cells or four cells and non-contiguous multi-cell HSDPA | Support of multi-cell HSDPA operation on three cells | Support of multi-cell HSDPA operation on four cells |
|  | Present | Support of non-contiguous multi-cell HSDPA on two cells only | Support of non-contiguous multi-cell HSDPA on three cells | Support of non-contiguous multi-cell HSDPA on four cells. |

(End of Table 3)

In some embodiments, the "symmetric blocks" which is only valid for 4C, and it is set to TRUE if the user equipment 121 supports 4C, so that each blocks of cells may have the same number of frequencies.

In some embodiments, the support of certain combinations may imply the support of a subset of combinations. This may be the case for the subset of combinations which have both equal or less number of aggregated carriers and equal or less number of gaps.

To perform the method actions for configuring cells for downlink operations, the network node 110 comprises the following arrangement depicted in FIG. 8. That is, to this end, the network node 110 comprises processing circuit(s), such as, the processing circuitry 803, operable to transmit and receive signalling for the SB-NC-4C-HSDPA operation capability. The processing circuit(s) can include any type of hardware and/or software suitable for implementing the procedures described herein. For example, the processing circuit(s) may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof.

FIG. 8 shows a schematic block diagram of embodiments of the network node 110. The network node 110 comprises a processing circuitry 803 configured to receive a signal from a user equipment 121 in the telecommunications system 100. The signal comprises information about radio access capability of the user equipment 121. The information about radio access capability of the user equipment 121 comprises a first indication which indicates the maximum number of cells that is supported by the user equipment 121 in the non-contiguous downlink operation. Furthermore, the information about radio access capability of the user equipment 121 comprises a second indication which indicates the maximum gap bandwidth between cells that is supported by the user equipment 121 in the non-contiguous downlink operation. Further, the processing circuitry 803 is configured to configure more than one cell for a non-contiguous downlink operation supported by the user equipment 121 based on the first and second indication in the information about radio access capability of the user equipment 121.

In some embodiments, the information about radio access capability of the user equipment 121 may further comprise a third indication. The third indication may indicate to the processing circuitry 803 that the user equipment 121 supports a maximum of four cells, e.g. f1, f2, f3, f4, and whether the user equipment 121 supports an equal number of cells on each side of a gap between the four cells, e.g. f1, f2, f3, f4, or a different number of cells on each side of a gap between the four cells, e.g. f1, f2, f3, f4. In this case, the processing circuitry 803 may be further configured to configure more than one cell for a non-contiguous downlink operation supported by the user equipment 121 based on this third indication in the information about radio access capability of the user equipment 121.

To perform the method actions for signalling information about radio access capability of the user equipment 121 to a network node 110, the user equipment 121 comprises the following arrangement depicted in FIG. 9. That is, to this end, the user equipment 121 comprises processing circuit(s), such as, the processing circuitry 902, operable to transmit and receive signalling for the SB-NC-4C-HSDPA operation capability. The processing circuit(s) can include any type of hardware and/or software suitable for implementing the procedures described herein. For example, the processing circuit(s) may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof.

FIG. 9 shows a schematic block diagram of embodiments of the user equipment 121. The user equipment 121 comprises a processing circuitry 902 configured to indicate, in the information about radio access capability of the user equipment 121, a first indication which indicates the maximum number of cells that is supported by the user equipment 121 in the non-contiguous downlink operation. Furthermore, the processing circuitry is configured to indicate, in the information about radio access capability of the user equipment 121, a second indication which indicates the maximum gap bandwidth between cells that is supported by the user equipment 121 in the non-contiguous downlink operation. Further, the processing circuitry 902 is configured to signal the information about radio access capability of the user equipment comprising the first and second indication to the network node.

In some embodiments, wherein the user equipment 121 supports a maximum of four cells, e.g. f1, f2, f3, f4, the processing circuitry 902 may be further configured to indicate a third indication in the information about radio access capability of the user equipment 121. The third indication indicating whether the user equipment 121 supports an equal number of cells on each side of a gap between the four cells, e.g. f1, f2, f3, f4, or a different number of cells on each side of a gap between the four cells, e.g. f1, f2, f3, f4.

Furthermore, in some embodiments, the first, second and third indication in the information about radio access capability of the user equipment 121 may be based on the number of radio frequency receivers in the user equipment 121, on the hardware design of the radio frequency receiver(s), and/or on other characteristics of the radio frequency receiver(s) in the user equipment 121.

In some embodiments, the maximum number of gaps between cells, e.g. f1, f2, f3, f4, is one gap G with a bandwidth of 5 MHz. Alternatively, the maximum number of gaps between cells, e.g. f1, f2, f3, f4, is two gaps with a total gap bandwidth of 10 MHz, or more than two gaps with the total gap bandwidth of more than 10 MHz.

According to some embodiments, the first, second and third indications may be comprised in a respective information element, IE, in the information about radio access capability of the user equipment 121.

Furthermore, in some embodiments, the at least one frequency band may be a single frequency band or more than one frequency band, e.g. a dual frequency band.

The embodiments described herein advantageously provide flexibility to the user equipment 121 to signal its SB-NC-4C-HSDPA operation capability, i.e. the signaling of the non-contiguous downlink operations on more than one cell supported by the user equipment 121, to the network node 110. This means that flexibility is provided to the user equipment 121 to signal one or more of any of the scenarios that are supported by the user equipment 121.

Another advantage of some of the embodiments described herein is that it provides a forward compatible signaling. This is because it does not involve any hardware or user equipment 121 implementations. This advantageously provides the freedom to the user equipment 121 to evolve the hardware design or any other specific characteristic of the implementation of the user equipment 121.

A further advantage of some of the embodiments described herein is that the signaling may be optimized by grouping different scenarios which may have similar user equipment 121 requirements, and that are readily extendible to signal the non-contiguous 8C operation, A further advantage of some of the embodiments described herein is that is that the signalling, as described herein for the SB-NC-4C capability, may be extended to dual band signalling, i.e. signalling in more than one frequency band.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. For example, when using the word "comprise" or "comprising" it shall be interpreted as non-limiting, i.e. meaning "consist at least of".

The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the solutions presented herein. This application is intended to cover any adaptations or variations of the specific embodiments discussed herein.

Abbreviations
3GPP The Third Generation Partnership Program
4C-HSDPA 4 Carriers HSDPA
DL Downlink
G Gap
IE Information Element
IOT InterOperability Testing
NC-4C-HSDPA Non-contiguous carriers in 4C-HSDPA
SB-NC-4C Non-contiguous carriers configured in a single 4C-HSDPA
RBS Radio Base Station
RF Radio Frequency
RRC Radio Resource Control
UE User Equipment
UL Uplink
UTRAN Universal Terrestrial Radio Access Network

The invention claimed is:

1. A method, in a network node, for configuring cells for downlink operations in a telecommunications system, the network node configured to support non-contiguous downlink operations on more than one cell in at least one frequency band, the method comprising:
receiving a signal from a user equipment in the telecommunications system comprising information about radio access capability of the user equipment, the information about radio access capability of the user equipment comprising:
a first indication indicating the maximum number of cells that is supported by the user equipment in the non-contiguous downlink operation;
a second indication indicating the maximum gap bandwidth between cells that is supported by the user equipment in the non-contiguous downlink operation;
a third indication, distinct from the first indication and second indication, indicating via a single Boolean value whether cell configuration that is symmetric with respect to a gap between cells is supported by the user equipment;
configuring more than one cell for a non-contiguous downlink operation supported by the user equipment based on the first, second, and third indications in the information about radio access capability of the user equipment.

2. The method of claim 1:
wherein the first indication indicates to the network node that the user equipment supports a maximum of four cells.

3. A network node for configuring cells for downlink operations in a telecommunications system, the network node configured to support non-contiguous downlink operations on more than one cell in at least one frequency band, the network node comprising processing circuitry configured to:
receive a signal from a user equipment in the telecommunications system comprising information about radio access capability of the user equipment, the information about radio access capability of the user equipment comprising:
a first indication indicating the maximum number of cells that is supported by the user equipment in the non-contiguous downlink operation;
a second indication indicating the maximum gap bandwidth between cells that is supported by the user equipment in the non-contiguous downlink operation;
a third indication, distinct from the first indication and second indication, indicating via a single Boolean value whether cell configuration that is symmetric with respect to a gap between cells is supported by the user equipment;
configure more than one cell for a non-contiguous downlink operation supported by the user equipment based on the first, second, and third indications in the information about radio access capability of the user equipment.

4. The network node of claim 3:
wherein the first indication indicates to the processing circuitry that the user equipment supports a maximum of four cells.

5. A method, in a user equipment, for signaling information about radio access capability of the user equipment to a network node in a telecommunications system, the user equipment configured to support non-contiguous downlink operations on more than one cell in at least one frequency band, the method comprising:
including in the information about radio access capability of the user equipment:
a first indication indicating the maximum number of cells that is supported by the user equipment in the non-contiguous downlink operation;
a second indication indicating the maximum gap bandwidth between cells that is supported by the user equipment in the non-contiguous downlink operation;
a third indication, distinct from the first indication and second indication, indicating via a single Boolean value whether cell configuration that is symmetric with respect to a gap between cells is supported by the user equipment;
signaling the information about radio access capability of the user equipment comprising the first, second, and third indications to the network node.

6. The method of claim 5:
wherein the user equipment supports a maximum of four cells;
wherein the first indication indicates that the user equipment supports four cells.

7. The method of claim 5, further comprising defining the first, second, and third indications in the information about radio access capability of the user equipment based on one or more of:
the number of receivers in the user equipment;
the hardware design of one or more radio frequency receivers in the user equipment;
other characteristics of the one or more radio frequency receivers in the user equipment.

8. The method of claim 5, wherein the first, second, and third indications are comprised in respective information elements in the information about radio access capability of the user equipment.

9. The method of claim 5, wherein the maximum gap bandwidth between cells is one of:
one gap with a bandwidth of 5 MHz;
two gaps with a total gap bandwidth of 10 MHz;
more than two gaps with the total gap bandwidth of more than 10 MHz.

10. The method of claim 5, wherein the at least one frequency band is more than one frequency band.

11. A user equipment for signaling information about radio access capability of the user equipment to a network node in a telecommunications system, the user equipment configured to support non-contiguous downlink operations on more than one cell in at least one frequency band, the user equipment comprising processing circuitry configured to:
include in the information about radio access capability of the user equipment:
a first indication indicating the maximum number of cells that is supported by the user equipment in the non-contiguous downlink operation;
a second indication indicating the maximum gap bandwidth between cells that is supported by the user equipment in the non-contiguous downlink operation;
a third indication, distinct from the first indication and second indication, indicating via a single Boolean value whether cell configuration that is symmetric with respect to a gap between cells is supported by the user equipment;
signal the information about radio access capability of the user equipment comprising the first, second, and third indications to the network node.

12. The user equipment of claim 11:
wherein the user equipment supports a maximum of four cells;
wherein the processing circuitry is further configured to indicate via the first indication that the user equipment supports four cells.

13. The user equipment of claim 11, wherein the first, second, and third indications in the information about radio access capability of the user equipment are based on one of:
the number of radio frequency receivers in the user equipment;
the hardware design of one or more the radio frequency receivers in the user equipment;
on other characteristics of the one or more radio frequency receivers in the user equipment.

14. The user equipment of claim 11, wherein the first, second, and third indications are comprised in respective information elements in the information about radio access capability of the user equipment.

15. The user equipment of claim 11, wherein the maximum number of gaps between cells is one of:
one gap with a bandwidth of 5 MHz;
two gaps with a total gap bandwidth of 10 MHz;
more than two gaps with the total gap bandwidth of more than 10 MHz.

16. The user equipment of claim 11, wherein the at least one frequency band is more than one frequency band.

17. The method of claim 8, wherein the first indication is comprised in an information element that was previously named as an Additional Secondary Cells information element.

18. The user equipment of claim 14, wherein the first indication is comprised in an information element that was previously named as an Additional Secondary Cells information element.

* * * * *

UNITED STATES PATENT AND TRADEMARK OFFICE
CERTIFICATE OF CORRECTION

| | |
|---|---|
| PATENT NO. | : 8,892,105 B2 |
| APPLICATION NO. | : 13/511550 |
| DATED | : November 18, 2014 |
| INVENTOR(S) | : Lidian et al. |

Page 1 of 2

It is certified that error appears in the above-identified patent and that said Letters Patent is hereby corrected as shown below:

ON THE TITLE PAGE

On Page 2, in Item (56), under "OTHER PUBLICATIONS", in Column 1, Line 2, delete "HSPDA"," and insert -- HSDPA", --, therefor.

IN THE SPECIFICATION

In Column 1, Line 20, delete "out" and insert -- just --, therefor.

In Column 1, Line 33, delete "transmissions" and insert -- transmissions. --, therefor.

In Column 2, Line 8, delete "contigously" and insert -- contiguously --, therefor.

In Column 3, Line 54, delete "contigously" and insert -- contiguously --, therefor.

In Column 3, Line 59, delete "achieved," and insert -- achieved. --, therefor.

In Column 5, Line 47, delete "sonic" and insert -- some --, therefor.

In Column 8, Line 17, delete "muti-" and insert -- multi- --, therefor.

In Column 8, Line 46, delete "net" and insert -- set --, therefor.

In Column 10, Line 59, delete "5 Hz;" and insert -- 15 Hz; --, therefor.

In Column 11, Line 18, delete "carrier/frequencie/cell." and insert -- carrier/frequency/cell. --, therefor.

In Column 11, Line 32, delete "cell" and insert -- cell $f_1$ --, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 8,892,105 B2

IN THE SPECIFICATION

In Column 12, Line 49, delete "capability," and insert -- capability. --, therefor.

In Column 13, Line 22, delete "block cells" and insert -- block of cells --, therefor.

In Column 14, Line 57, delete "the" and insert -- if the --, therefor.

In Column 16, Line 59, delete "operation," and insert -- operation. --, therefor.